Patented Aug. 22, 1950

2,519,440

UNITED STATES PATENT OFFICE 2,519,440

XYLYLENE BIS(QUATERNARY AMMONIUM HALIDES)

Peter L. de Benneville, Philadelphia, Pa., Louis H. Bock, Shelton, Wash., and Richard W. Gormly, Collingswood, N. J., assignors to Rohm & Haas Company, Philadelphia, Pa., a corporation of Delaware No Drawing. Application June 29, 1949, Serial No. 102,145

4 Claims. (Cl. 260—567.6)

1

This invention relates to xylylene bis(quaternary ammonium halides). These are novel and useful salts of the general formula

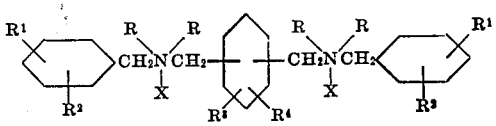

wherein R is an alkyl group of not over two carbon atoms, $R^1$ is an alkyl group of seven to nine carbon atoms, $R^2$, $R^3$ and $R^4$ are hydrogen or methyl, and X is chlorine or bromine. The compounds of this formula exhibit outstanding activity against bacteria and fungi.

These compounds may be prepared by reacting together a xylylene dihalide and an alkylbenzyldimethylamine or an alkylbenzyldiethylamine in which the alkyl group has seven to nine carbon atoms. Alternatively, they are prepared by reacting together an alkylbenzyl halide and a bis(dimethylaminomethyl)benzene or bis(diethylaminomethyl)benzene.

Xylylene dichloride and its methylated forms are available through known reactions. Methods of preparation are described by Stephen, Short, and Gladding, J. Chem. Soc. 117, 510 (1920), by Blanc, Bull. soc. chem. [4] 33, 313 (1923), and by v. Braun and Nelles, Ber. 67, 1094 (1934). The two chloromethyl groups may occur ortho, meta, or para to each other. Bromomethyl groups may be used in place of chloromethyl. Either xylylene dichloride or xylylene dibromide may be reacted with an alykylbenzyldimethylamine or alkylbenzyldiethylamine to give the desired bis quaternary salts. For the alternate method a xylylene dichloride or dibromide is first converted to a bis(alkylaminomethyl)benzene or toluene by reaction with diethylamine or dimethylamine.

For the method in which a bis(dialkylaminomethyl)benzene or a bis(dialkylaminomethyl)-toluene (in which the alkyl group is methyl or ethyl) is reacted with an alkylbenzyl halide, a suitable procedure starts with a xylylene dihalide. This dihalide is reacted with dimethylamine or diethylamine in the presence of a basic substance to combine with hydrogen halide. A strong base, such as sodium hydroxide or potassium hydroxide is used or an excess of dimethylamine or diethylamine which forms a dialkylamine hydrohalide, which is readily separated from the reaction mixture. The reaction between a xylylene dihalide and dialkylamine is performed between 20° and 100° C. usually in an inert solvent, such as benzene, toluene, or naptha. The salt formed

2 is separated out and the bis(dialkylaminomethyl)benzene or toluene recovered. Further details of a typical preparation of a bis(dialkylaminomethyl)benzene are given in the following example.

Example 1

Dimethylamine gas was passed into a solution of 100 parts by weight of para-xylylene dichloride in 265 parts of benzene. The heat of reaction was removed by external cooling with ice water. When the initial vigor of the reaction had subsided, the reaction mixture was heated under reflux for an hour while dimethylamine was passed in. The reaction mixture was chilled in an ice bath. Dimethylamine hydrochloride separated and was filtered off. The solution was stripped of benzene, leaving as a residue 80 parts of a product which was found to be 95% pure bis(dimethylaminomethyl)benzene. The product was distilled at 109°–115° C./4.2 mm. to give a pure product, having a neutral equivalent of 96 (theory 96).

In the same way other bis(halomethyl)benzenes or bis(halomethyl)methylbenzenes are converted to corresponding bis(dimethylaminomethyl) derivatives, which are to be reacted with an alkylbenzyl halide of the proper size.

Example 2

To 17.5 parts by weight of xylylene dichloride in 75 parts of benzene there was added 36.5 parts of diethylamine. The mixture was refluxed for 21 hours and then cooled. Diethylammonium chloride, which was present as a solid, was removed by filtration. The benzene solution was washed several times with water, dried over dehydrated calcium sulfate, and distilled. There was obtained at 128°–129° C./1.8 mm. 18 parts of p-bis(diethylaminomethyl)benzene. This product had a neutral equivalent of 124 (theory is 124).

The alkylbenzyl halides which are required are prepared in accordance with the method described in the patent application of de Benneville and Bock, application Serial No. 28,274, filed May 20, 1948. An alkylbenzene, or an alkyltoluene, the two being equivalent for purposes of the present invention, in which the alkyl group contains seven to nine carbon atoms, is halomethylated by reacting it with anhydrous formaldehyde and hydrogen chloride or hydrogen bromide in the presence of a catalyst mixture formed by mixing one molecular proportion of zinc chloride with 1.5 to 8 molecular proportions of an aliphatic monocarboxylic acid of one to three carbon atoms, such as formic, acetic, chloroacetic, or propionic. Acid anhydrides are equivalent to the acids and may be used in lieu thereof or admixed therewith. Formaldehyde may be used as a gas or as a revertible polymer. The equivalent of formaldehyde and hydrogen bromide or chloride is obtained by use of a halomethyl ether. It should be noted that hydrogen chloride and hydrogen bromide are essentially equivalent in the above reactions.

For one mole equivalent of an alkylbenzene from one to 2.5 and, preferably, 1.5 to 2.5 molecular equivalents of formaldehyde are used together with 0.75 to 2.5 molecular proportions of zinc chloride associated with a proportion of monocarboxylic acid given above. Reaction temperatures of 50° to 100° C. are effective here. By this method good yields of alkylbenzyl halides are obtained with introduction almost entirely of a single halomethyl group and without formation of troublesome resinous by-product.

Alkylbenzenes or their equivalents as alkyltoluenes are, according to the alternate procedure, convenient starting materials. Unsubstituted alkylbenzenes are preferred to the alkyltoluenes and for purposes of the instant invention the alkyl groups vary from seven to nine carbon atoms. The exact form of this alkyl group does not appear to be of great import. It may be of straight or branched chain structure. It may be primary, secondary, or tertiary. The relative position of the alkyl group in the final compound and the relative position of alkyl and methyl groups in alkyltoluenes is unimportant.

For preparing the alkylated hydrocarbons known methods may be used. For example, an acyl halide may be reacted with benzene or toluene and the acyl group thus introduced be then reduced. By other procedures olefinic hydrocarbons of the required size are reacted with benzene or toluene. The useful-sized alkyl groups vary from heptyl through octyl to nonyl. There are thus used heptylbenzene, heptyltoluene, octylbenzene, octyltoluene, nonylbenzene, and nonyltoluene in their various isomeric forms.

Preparation of typical alkylbenzyl halides is shown in the following illustrative examples.

Example 3

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

Example 4

Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-methyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

Example 5

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

Example 6

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid, while the mixture was stirred and held at 5° C. The mixture was stirred for three hours more while the temperature was carried to 30° to 40° C. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and form layers. The layers were separated and the upper layer was washed with water, with sodium bicarbonate solution, and with water, and distilled. The fraction collected at 127°–132° C./2 mm., amounting to 128 parts, corresponded in composition to heptylbenzyl chloride.

Example 7

A mixture of 95 parts of 2-octylbenzene with some 3-octylbenzene, 30 parts of paraformaldehyde, 54 parts of anhydrous zinc chloride, and 120 parts of glacial acetic acid was stirred at 50° C., while hydrogen chloride was passed in for two hours at a fairly rapid rate. The reaction mixture was allowed to form layers, which were separated. The upper layer was washed with hot water, with a 10% sodium bicarbonate solution, and with hot water, dried over sodium sulfate, and distilled. The forerun of 30 parts consisted of octylbenzene. There was then obtained at 119°–121° C./1 mm. 71 parts of octylbenzyl chloride.

Example 8

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

The reaction between xylylene dihalide and an alkylbenzyldialkylamine and also the reaction between bis(dialkylaminomethyl)benzene or its toluene analogue and an alkylbenzyl halide are conducted by bringing together the respective reactants and warming the mixture to accelerate and complete the reaction. Temperatures between 20° and 120° C. are generally suitable. The reaction may be effected without or with a solvent. Useful solvents include hydrocarbons such as benzene, toluene, and xylene, alcohols, such as isopropyl or butyl, and other inert organic solvents, such as acetonitrile, nitroparaffins, including nitromethane, and formamide.

The preparation of the quaternary ammonium salts of this invention is further described in the following illustrative examples.

Example 9

There were dissolved in 440 parts of benzene 35 parts of p-xylylene dichloride and 103 parts of 2-octylbenzyldimethylamine. The solution was heated for three hours under reflux and then cooled to 0° C. Crystals formed and were separated by filtration. They corresponded fairly closely in composition to p-xylylene bis(octylbenzyl dimethyl ammonium chloride). They had an ionizable chlorine content of 10.1%, while the theoretical value is 10.6%.

Against *Salmonella typhosa* this compound had a phenol coefficient of 705. Against *Staphylococcus aureus* it had a coefficient of 1500.

Example 10

There were mixed 113 parts of heptylbenzyl chloride, 48 parts of bis(dimethylaminomethyl)benzene and 300 parts of benzene. The mixture was heated to cause solution and heated under reflux for three hours. The solution was cooled. Crystals formed. They were filtered off to yield 140 parts of a colorless crystalline quaternary salt which by test contained 10.6% of ionizable chlorine (theory 11.0%), corresponding to p-xylylene bis(heptylbenzyl dimethyl ammonium chloride).

This compound was examined by the standard F. D. A. method for determining phenol coefficients. It has a value of 500 against *Salmonella typhosa* and 785 against *Staphylococcus aureus*.

Example 11

A mixture of 133 parts of chloromethylnonyltoluene, 48 parts of bis(dimethylaminomethyl)benzene, and 300 parts of benzene was heated on the steam bath for four hours. The benzene was driven off and there was obtained 180 parts of a solid, which corresponded in composition with p-xylylene bis(methylnonylbenzyl dimethyl ammonium chloride).

This product had a phenol coefficient of 585 against *Salmonella typhosa* and of 1100 against *Staphylococcus aureus*.

Example 12

A solution was made in 530 parts of benzene of 44 parts of o-xylylene dichloride and 135 parts of octylbenzyldimethylamine. It was heated for three hours at reflux temperatures and cooled. Crystals formed and were separated by filtration. The yield was 125 parts of a product which had an ionizable chlorine content of 10.6% (theory 10.6%). It was o-xylylene bis(octylbenzyl dimethyl ammonium chloride). It has a phenol coefficient of 555 against *Salmonella typhosa* and of 1200 against *Staphylococcus aureus*.

Example 13

Commercial meta-xylene was dichloromethylated by the method of von Braun and Nelles, Ber. 67, 1098 (1934), yielding 1,5-dimethyl-2,4-bis-(chloromethyl)benzene. A solution of 10.1 parts of this compound, 24.7 parts of octylbenzyldimethylamine, and 66 parts of benzene was heated for four hours under reflux. Benzene was evaporated to yield a residue which was a light tan solid, somewhat soluble in cold water and freely soluble in hot water. It has an ionizable chlorine content of 10.1% (theory 10.2%) and corresponds closely in composition to dimethylxylylene bis(octylbenzyl dimethyl ammonium chloride). It has a phenol coefficient of 440 against *Salmonella typhosa*.

Example 14

A solution of 19.2 parts of p-bis(dimethylaminomethyl)benzene and 56.6 parts of p-2-octylbenzyl bromide was made in 200 parts of benzene. The solution was heated under reflux for an hour and left standing for 16 hours. The mixture was then cooled. Crystals formed, which were filtered off. Additional product was obtained by evaporating the benzene. The product was slightly soluble in hot water. It corresponded in composition to p-xylylene bis(octylbenzyl dimethyl ammonium bromide).

The phenol coefficient of the above compound was found to be 470 against *Salmonella typhosa* and 1100 against *Staphylococcus aureus*.

A p-xylylene bis(p-3,5,5-trimethyl hexylbenzyl dimethyl ammonium chloride) made by the same methods had a phenol coefficient of 855 against *Staphylococcus aureus*.

*Example 15*

There were mixed 101 parts of nonylbenzyl chloride, 49.6 parts of p-bis(diethylaminomethyl)benzene, and 300 parts of acetonitrile. The mixture was heated under reflux for 15 hours. A colorless solid precipitated and was filtered off. It was p-xylylene-bis(nonylbenzyl diethyl ammonium chloride).

The phenol coefficient of this product was found by standard methods to be 440 against *Salmonella typhosa* and 1100 against *Staphylococcus aureus*.

*Example 16*

To a solution of 40 parts of sodium hydroxide in 150 parts of water there was added 73 parts of diethylamine. There was then added 119 parts of octylbenzyl chloride. The mixture was heated under reflux for 4.5 hours. Two layers formed. The upper (organic) layer was separated, washed with water until neutral, dried over calcium chloride, and distilled under reduced pressure. The fraction obtained at 137°–140° C./1.2 mm. was octylbenzyldiethylamine in a yield of 109 parts.

There were mixed 14.6 parts of the above product, 4.4 parts of p-xylylene dichloride, and 30 parts of acetonitrile. The mixture was heated under reflux for 16 hours. A colorless solid formed which was separated by filtration. It corresponded in composition to p-xylylene bis-(octylbenzyl diethyl ammonium chloride), having an ionizable chlorine content of 9.82%. The theoretical ionizable chlorine content of this compound is 9.82%.

This product was found to have phenol coefficients of 525 and 1100 against *Salmonella typhosa* and *Staphylococcus aureus* respectively.

The effectiveness of the compounds of this invention may be further established by consideration of their effectiveness on dilution as determined by the maximum dilutions at which they are definitely bacteriostatic and bactericidal against a variety of Gram-positive and Gram-negative organisms in a culture broth. The determinations are made by a method of successive dilution in which trypticase-soy broth is utilized. A one per cent aqueous solution of a compound is diluted with broth. The various dilutions are autoclaved for ten minutes at 10 to 12 pounds pressure. The dilutions are cooled and inoculated with a 4 mm. loopful of a culture of a test organism. Incubation is performed at 37° C. for 24 hours. The dilutions are then examined. The highest dilution showing no growth gives the bacteriostatic value.

The dilutions are incubated for another 24 hours and then subcultures are made by transferring three 4 mm. loopfuls from cultures showing no growth to fresh broth. The subcultures are incubated at 37° C. for 48 hours. The highest dilution showing no growth gives the bactericidal value.

Data thus determined for p-xylylene bis(n-octylbenzyl dimethyl ammonium chloride are summarized in the table wherein the bactericidal (Bc) and bacteriostatic (Bs) dilutions are noted against a variety of organisms of both Gram-types (+ or −).

TABLE

*Maximum effective dilutions of xylylene bis (octylbenzyl dimethyl ammonium chloride)*

| Organisms | Gram-type | Effective Dilutions/1000 | |
|---|---|---|---|
| | | Bs | Bc |
| S. aureus | + | 320 | 160 |
| S. pyogenes | + | 640 | 320 |
| S. fecalis | + | 320 | 320 |
| N. catarrhalis | − | 640 | 40 |
| S. typhosa | − | 160 | 80 |
| Ps. aeruginosa | − | 40 | 4 |
| Ps. vulgaris | − | 10 | 2 |
| C. welchii | − | 80 | 80 |

The data show very good effectiveness against highly resistant organisms and against a wide variety of organisms. These compounds are readily prepared from relatively inexpensive raw materials by convenient methods of synthesis. They are economically desirable and have a degree of bacteriostatic and bactericidal activity which makes them highly desirable disinfectants. They are also effective fungicides against a wide variety of fungi.

For the preparation of alkylbenzyldimethylamines or alkylbenzyldiethylamines which are reacted with a xylylene dihalide as in Examples 9, 12, 13, and 16 there may be followed the methods shown in Examples 1, 2, and 16. These are similar to methods used for the reaction of benzyl chloride and dimethylamine as given in Ber. 42, 2593 (1909) or Bull. soc. chim. (IV) 15, 168 (1915) except that an alkylbenzyl halide is used and the system need not be anhydrous. Dimethylamine or diethylamine is reacted with an alkylbenzyl halide in the presence of a strong base such as sodium hydroxide to take up the hydrogen halide or with an excess of the amines to form an amine hydrohalide which is separated. The reaction is desirably carried out in the presence of an inert organic solvent such as benzene, toluene, carbon tetrachloride, or the like. Aqueous caustic solution may here be used, if desired. The alkylbenzyldimethylamine or alkylbenzyldiethylamine may usually be purified by distillation. The following preparations give details to supplement what has already been shown.

*Example 17*

To a solution of 8 parts of sodium hydroxide in 30 parts of water there was added 22.5 parts of an aqueous 40% dimethylamine solution. The reaction vessel in which this mixture was prepared carried a refluxing system cooled with Dry Ice and acetone. To the mixture there was added 22.5 parts of heptylbenzyl chloride. The mixture was heated to give gentle refluxing and dimethylamine gas was slowly passed in during a period of three hours. The reaction mixture was allowed to form layers which were separated. The product layer was washed with water until neutral to litmus and heated under reduced pressure. There was obtained 20 parts of a light oil which gave the proper analysis for heptylbenzyl-dimethylamine.

When this procedure was followed with 25.3 parts of nonylbenzyl chloride in place of the 22.5 parts of heptylbenzyl chloride, there was obtained 18 parts of product which corresponded by nitrogen analysis to nonylbenzyldimethylamine. The procedure followed with 23.8 parts of 2-octylbenzyl chloride yielded (2-octylbenzyl)-dimethylamine.

We claim:

1. As new chemical substances, compounds of the formula

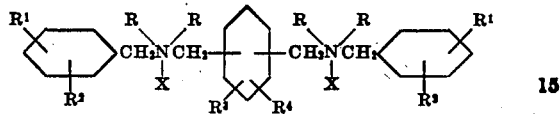

wherein R is an alkyl group of not over two carbon atoms, $R^1$ is an alkyl group of seven to nine carbon atoms, $R^2$, $R^3$, and $R^4$ are members of the class consisting of hydrogen and the methyl group, and X is a member of the class consisting of chlorine and bromine.

2. As a new chemical compound,

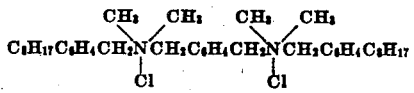

3. As a new chemical compound

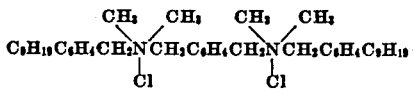

4. As a new chemical compound

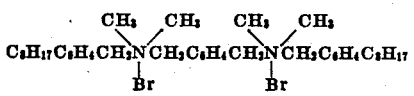

PETER L. DE BENNEVILLE.
LOUIS H. BOCK.
RICHARD W. GORMLY.

No references cited.